United States Patent [19]
Thurlow et al.

[11] Patent Number: 6,089,631
[45] Date of Patent: Jul. 18, 2000

[54] TONGS FOR HANDLING FOOD

[75] Inventors: Heida L. Thurlow, Houston, Tex.; Ng Wai-Kit, Kowloon, The Hong Kong Special Administrative Region of the People's Republic of China

[73] Assignee: Lentrade, Inc., Houston, Tex.

[21] Appl. No.: 09/411,430

[22] Filed: Oct. 1, 1999

[51] Int. Cl.⁷ .............................. A47G 21/10; A47J 43/28
[52] U.S. Cl. .............................. 294/16; 294/28; 294/99.2; 294/106
[58] Field of Search .................................. 294/3, 7, 8, 8.5, 294/11, 16, 28–31.1, 33, 82.32, 85, 99.2, 100, 106, 110.1, 115–117

[56] References Cited

U.S. PATENT DOCUMENTS

| | | | |
|---|---|---|---|
| 852,479 | 5/1907 | Weiss | 294/99.2 X |
| 1,387,917 | 8/1921 | Bowe | 294/115 |
| 2,800,356 | 7/1957 | Benton | 294/106 |
| 2,864,645 | 12/1958 | Meldrum | 294/106 |
| 3,084,893 | 4/1963 | Ruth | 294/85 X |
| 3,211,488 | 10/1965 | Duranel | 294/116 |
| 5,199,756 | 4/1993 | Bartlett et al. | 294/16 |

FOREIGN PATENT DOCUMENTS

| | | | |
|---|---|---|---|
| 284150 | 5/1915 | Germany | 294/82.32 |
| 86255 | 5/1936 | Sweden | 294/82.32 |
| 1437340 | 11/1988 | U.S.S.R. | 294/116 |
| 177367 | 3/1922 | United Kingdom | 294/11 |

*Primary Examiner*—Johnny D. Cherry
*Attorney, Agent, or Firm*—Browning Bushman

[57] ABSTRACT

Locking tongs (10) have an upper arm (12) and a lower arm (14) pivotally mounted to each other for grasping items, such as food. A pivot pin (24) extends through aligned openings (27) in side flange extensions (20, 22) of arms (12 and 14) to connect arms (12 and 14) for pivotal movement. Torsion spring (28) urges arms (12, 14) apart. A channel-shape slidable locking member (32) has side flanges (36) with transversely aligned slots (40) therein receiving pin (24). Hook (39) has a hook portion (42) which may be easily gripped for sliding movement of channel-shaped locking member (32) between a locked position of arms (12, 14) shown in FIG. 1 and an open position of arms (12,14) shown in FIG. 4. Hook (39) is also utilized for hanging tongs (10) in a vertical position from a wall or rack.

9 Claims, 3 Drawing Sheets

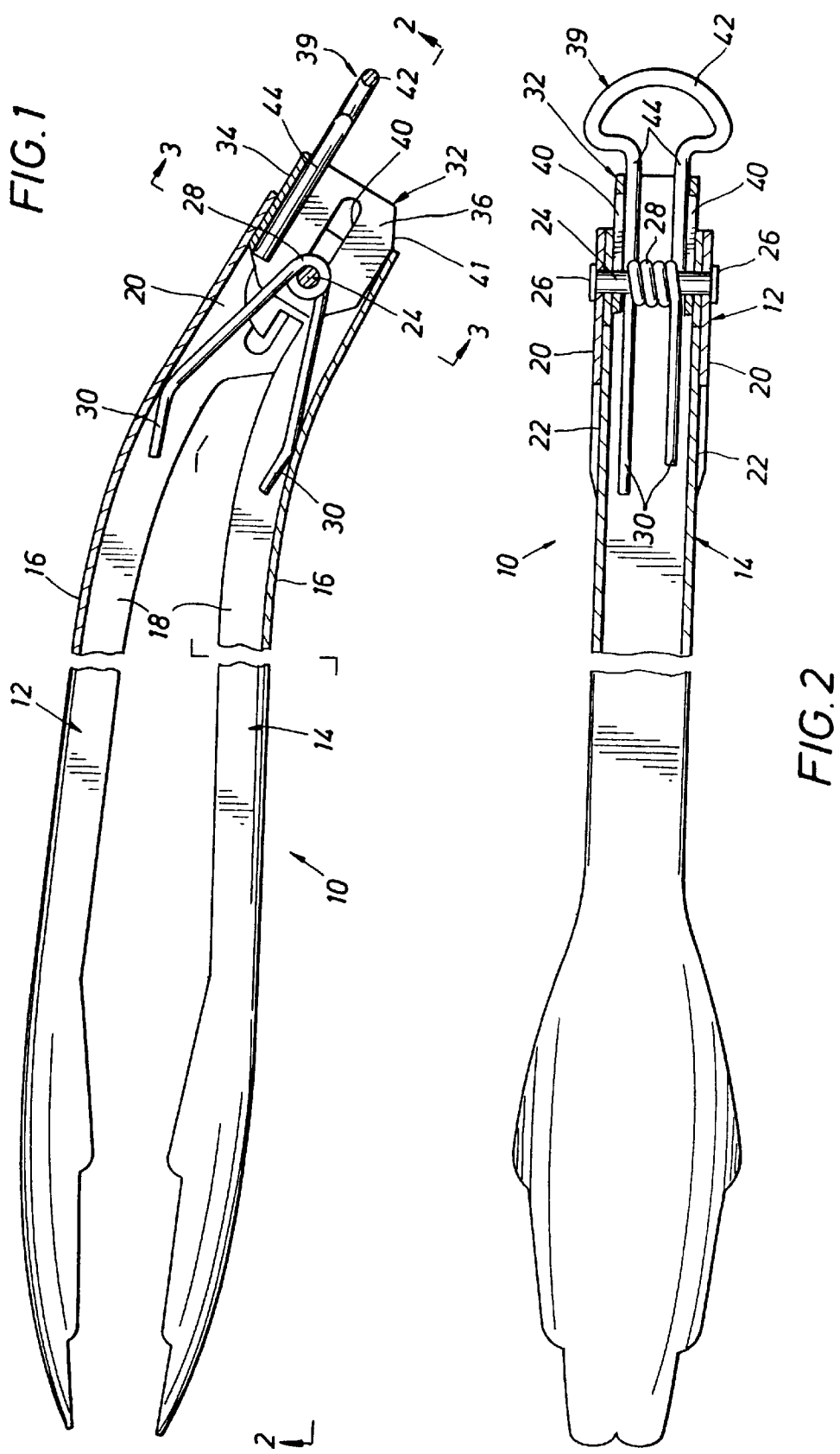

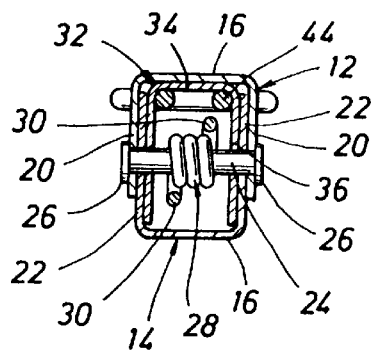
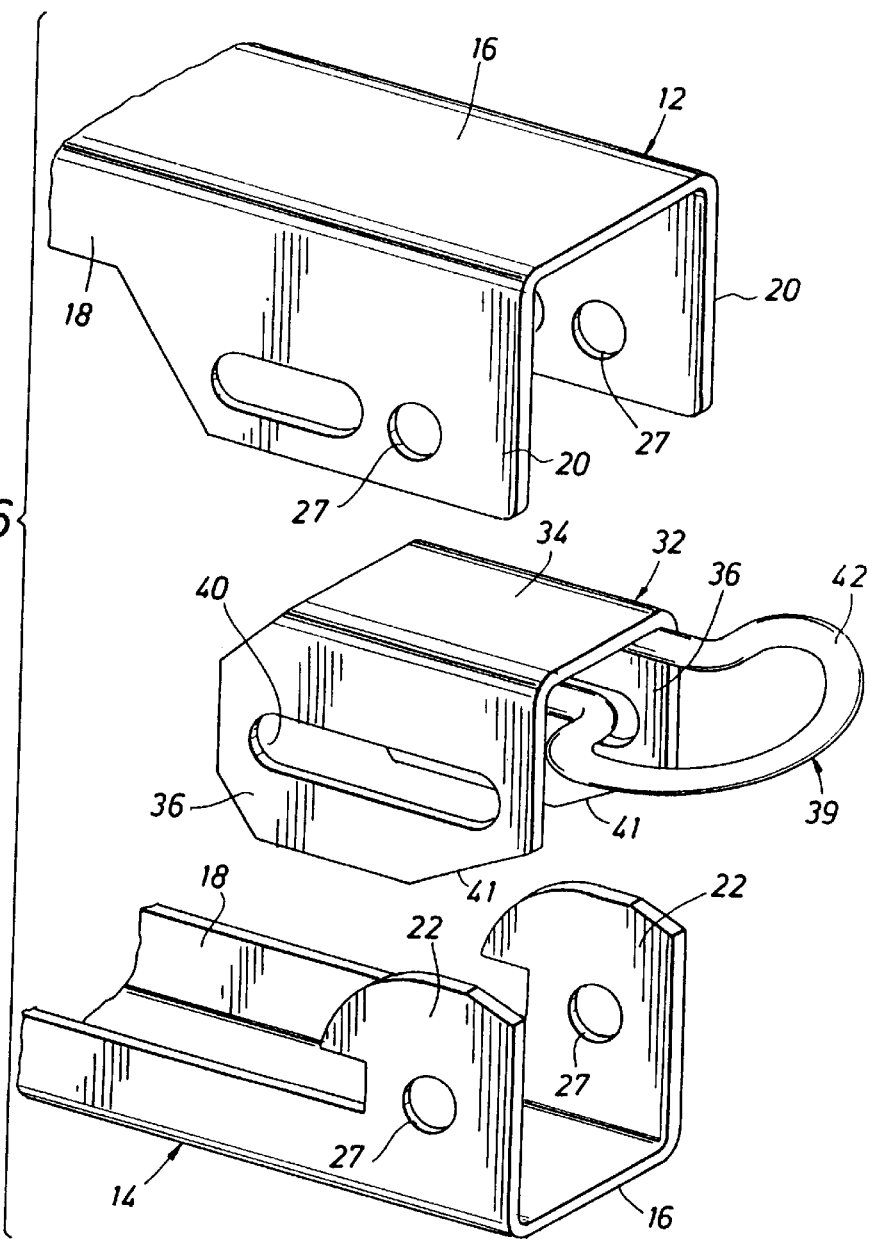

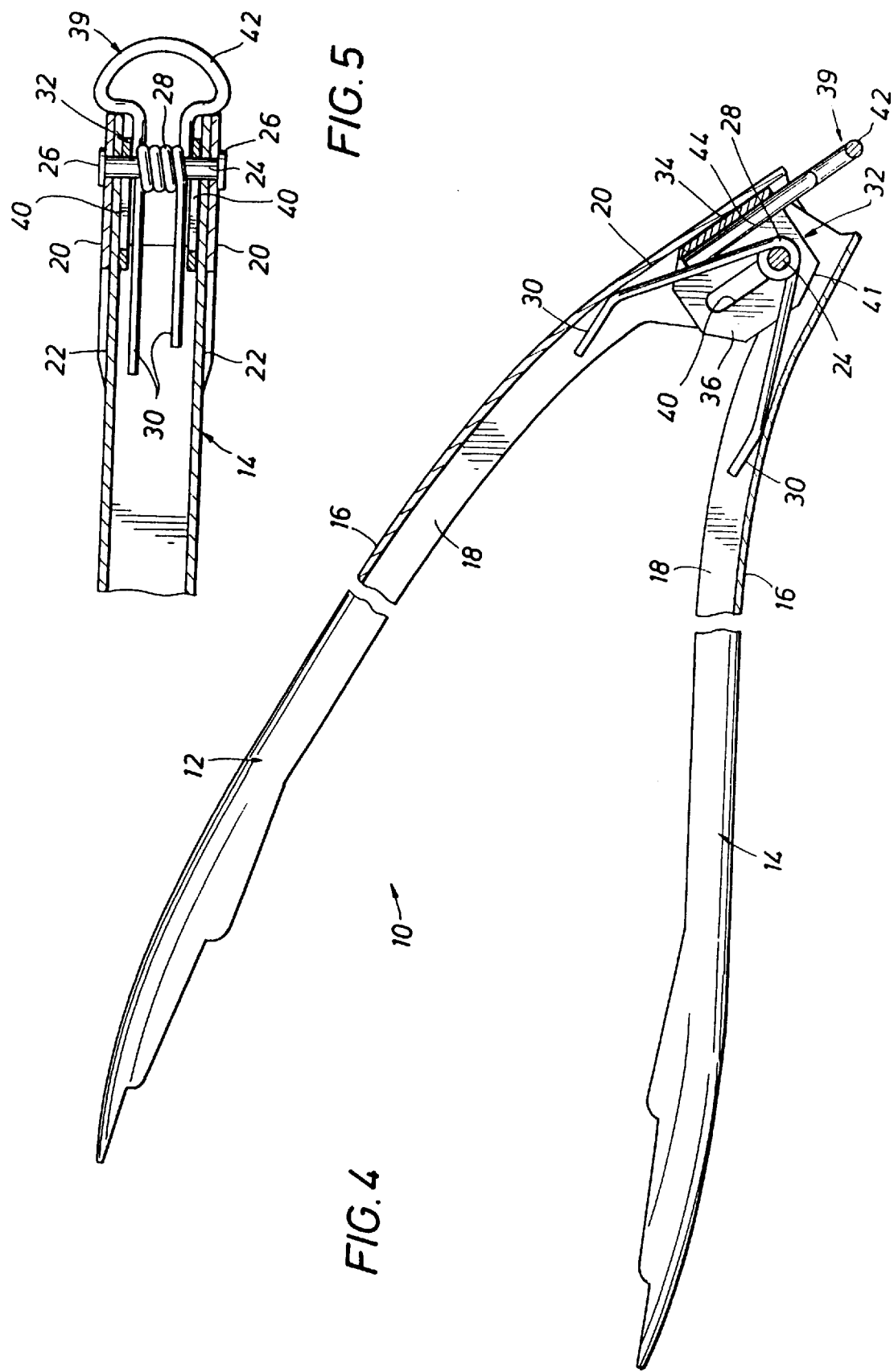

6,089,631

TONGS FOR HANDLING FOOD

FIELD OF THE INVENTION

This invention relates to tongs for handling food, and more particularly to such tongs having a slidable locking member mounted for selective movement between a closed position of the tongs and an open position of the tongs.

BACKGROUND OF THE INVENTION

Heretofore, such as shown in U.S. Pat. No. 5,199,756 dated Apr. 6, 1993, tongs have been provided which may be releasably locked in a closed position when not in use such as desirable for storage or cleaning in a dishwasher, for example. The tongs in the '756 patent includes a locking plate movable between a locked closed position of the tongs in which both tongs or arms are blocked by the locking plate and an unlocked open position of the tongs in which both tongs or arms are pivoted relative to the locking plate to an open position for use. The locking plate has a relatively complicated slot arrangement and may tilt relative to the arms resulting in possible binding.

It is an object of the present invention to provide a simplified releasably locking mechanism for a pair of tongs which is easily moved between open and closed positions of the tongs without canting or tilting.

Another object of the present invention is to provide a pair of tongs with a slidable channel-shaped locking member having opposed flanges with transversely aligned elongate slots receiving a pivot pin for the tongs to facilitate sliding movement of the locking member between opened and closed positions of the tongs.

SUMMARY OF THE INVENTION

The locking tongs of the present invention include a pair of tongs or arms connected to each other for pivotal movement between open and closed positions. A locking member for releasably locking the tongs in a closed position when not in use for gripping food comprises a channel-shaped slide including a base and a pair of integral side flanges or legs. The side flanges have elongate slots therein receiving a pivot pin mounting the tongs for pivotal movement. The tongs are of a channel-shaped configuration adjacent their inner ends and the channel-shaped locking member fits closely within the channel-shaped tongs to minimize any canting or tilting of the locking member during movement thereby facilitating manual movement of the locking member between the open and closed positions of the tongs. The base of the channel-shaped locking member is mounted adjacent and in contact with the base or web of the upper tong and pivots with the upper tong upon pivotal movement of the upper tong relative to the lower tong. The flanges of the channel-shaped locking member have an outer corner thereof cutaway to permit pivoting of one tong to an open position relative to the other tong when the locking member is pushed inwardly to a retracted position.

Other features and advantages of the invention will be apparent from the following specification and drawings.

BRIEF DESCRIPTION OF THE DRAWINGS

FIG. 1 is a side elevation of a pair of tongs for handling foods with certain parts broken away, and showing a slidable locking member in an extended position in the closed position of the tongs;

FIG. 2 is a top plan of the tongs shown in FIG. 1 with certain parts broken away to show the slidable locking member;

FIG. 3 is a section taken generally along the line 3—3 of FIG. 1;

FIG. 4 is a side elevational view similar to FIG. 1 but showing the tongs in an open position with the slidable locking member in a retracted position to permit pivotal movement of the tongs to an open position;

FIG. 5 is a sectional view of the inner end of the tongs showing the slidable locking member in a retracted position with the tongs in an open position;

FIG. 6 is an exploded view of the end portion of the tongs showing the locking member removed from the tongs.

Referring to the drawings for a better understanding of this invention, the locking tongs of the present invention are shown generally at 10 having an upper arm or tong 12 and a lower arm or tong 14 for grasping items, such as food therebetween. Each arm 12, 14 has a web or base 16 and opposed side flanges 18 extending from base 16. A pair of end side flange extensions 20 extend downwardly from upper tong 12 and a pair of end side flange extensions 22 extend upwardly from lower leg 14 and are received within and alongside extensions 20. A pivot pin 24 having end flanges 26 extends through aligned openings 27 in flange extensions 20, 22 to connect arms 12 and 14 for pivotal movement. A torsion spring 28 is mounted about pin 24 and has ends 30 engaging arms 12 and 14 to continuously urge arms 12 and 14 apart.

It is desirable that arms 12 and 14 be held together in a closed position particularly for cleaning and storing as tongs in an open position will not fit easily into a dishwasher or storage drawer, for example. An important part of the present invention comprises a slidable locking member generally designated 32 for releasably locking arms 12 and 14 in a closed position as shown in FIGS. 1 and 2 in the closed position of locking member 32, and movable to a retracted position as shown in FIGS. 4 and 5 to permit pivoting of arms 12 and 14 to an open position. Sliding locking member 32 is channel-shaped defining a base 34 and opposed side flanges 36 with base 34 fitting against base 16 of upper arm 12 as shown in FIG. 3. Opposed side flanges 36 fit between and contact end side flange extensions 22 on lower arm 14. Slidable locking member 32 moves with upper arm 12 when arms 12 and 14 move between open and closed positions. Flanges 36 assist slidable locking member 32 in fitting closely adjacent flange extensions 22 of lower arm 14. Side flanges 36 have transversely aligned elongate slots 40 therein of a uniform width and receiving pivot pin 24 therein for sliding movement of locking member 32. Outer corners of flanges 36 are cutaway at 41 to permit pivoting of lower arm 14 to an open position relative to upper arm 12 upon retraction of slidable locking member 32 as shown in FIGS. 4 and 5.

A hook generally indicated at 39 has an outer extending hook portion 42 and prongs 44 extending from hook portion 42. The prongs 44 are secured, such as by spot welding, to the base 34 of locking member 32 to mount hook 39 thereon. End hook portion 42 forms a gripping tab which may be easily gripped for movement of locking member 32 between the open and closed positions of the tongs. Hook portion 42 may be used for supporting tongs 10 in a vertical position from a pin or post on a wall or board for storage or display. Slidable locking member 32 being channel-shaped fits closely within and alongside base 16 of upper arm 12 and side flange extensions 22 on lower arm 14. Pivot pin 24 slides along transversely aligned slots 40 in side flange extensions 36 of slidable locking member 32 without any canting movement of locking member 32. Locking member 32 is easily moved between a retracted position in the open position of tongs 10 as shown in FIG. 4 and a projected position in the closed position of tongs 10 as shown in FIG. 1. Pin 24 slides along transversely aligned slots 40 smoothly as slots 40 are of a uniform width with side flanges 36 of locking member 32 guiding movement of channel-shaped locking member 32.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. Locking tongs for gripping items comprising:

a pair of arms having inner ends mounted for pivotal movement about a pivot pin and having opposed outer ends arranged for gripping an item therebetween;

each of said arms having a body and a pair of inturned flanges adjacent the inner end of each body, the inturned flanges of one arm being received therebetween the inturned flanges of the other arm with said pivot pin extending through said inturned flanges of both arms to mount said arms for pivotal movement; and a generally channel-shaped locking member including a base and opposed flanges extending from said base;

said locking member having a manual actuating tab adjacent an end thereof for gripping by a user to move said locking member between a locked closed position of said tongs and an unlocked open position of said tongs; said channel-shaped locking member being received between said inturned flanges of one of said tongs and fitting closely against said inturned flanges for being guided between locked and unlocked positions of said tongs.

2. The locking tongs as defined in claim 1 wherein said opposed flanges of said locking member have elongate slots therein receiving said pivot pin for limiting sliding movement of said locking member between locked and unlocked positions.

3. The locking tongs as defined in claim 2 wherein said channel-shaped locking member slides between an extended locked position with said pivot pin adjacent one end of said elongate slots and a retracted unlocked position with said pivot pin adjacent an opposite end of said elongate slots.

4. The locking tongs are defined in claim 1 wherein a spring member between said arms continuously urges said arms toward open position.

5. The locking tongs as defined in claim 1 wherein said arms when gripped normally by a user include an upper arm and a lower arm, said base of said channel-shaped locking member fitting within and in contact with the body of one of said arms and pivoting with said one arm relative to the other arm.

6. The locking tongs as defined in claim 5 wherein said one arm comprises said upper arm and a gripping tab is secured to said base of said locking member and extends therefrom for gripping at said locked and unlocked positions of said locking member.

7. The locking tongs as defined in claim 6 wherein said tab comprises a hook secured to said base of said channel-shaped locking member.

8. The locking tongs as defined in claim 1 wherein said flanges of said channel-shaped locking member on an end of said locking member have cutaway corners, said cutaway corners permitting pivoting of said lower arm when said locking member is in the retracted unlocked position of said arms.

9. The locking tongs as defined in claim 8 wherein said flanges of said upper arm receive said flanges of said lower arm in a close fitting relation.

* * * * *